Feb. 12, 1924.
E. A. SPERRY ET AL
SIGNALING SYSTEM FOR WARSHIPS
Filed May 20, 1918
1,483,489
6 Sheets-Sheet 1
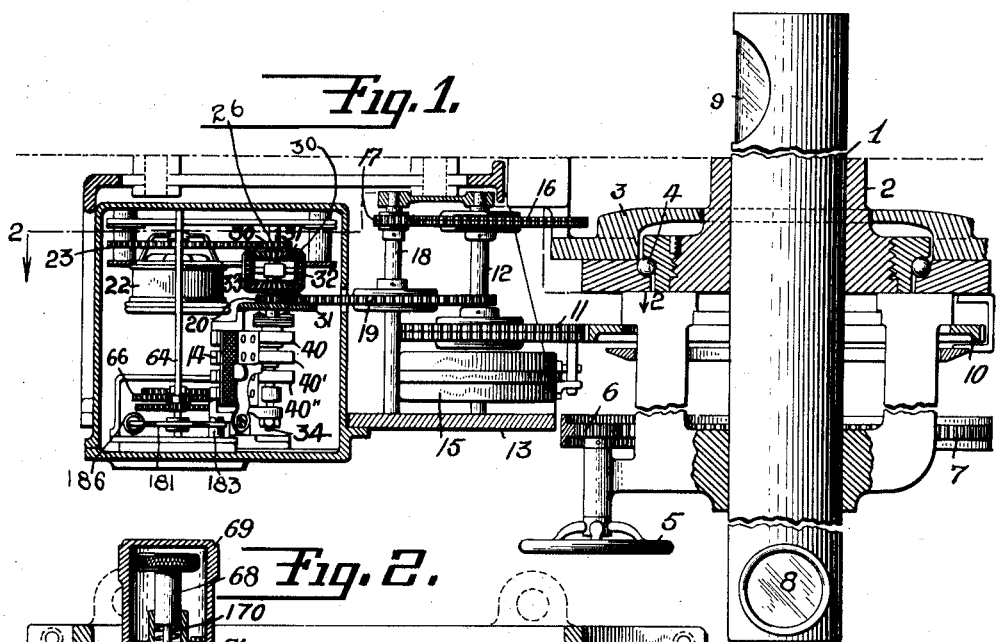
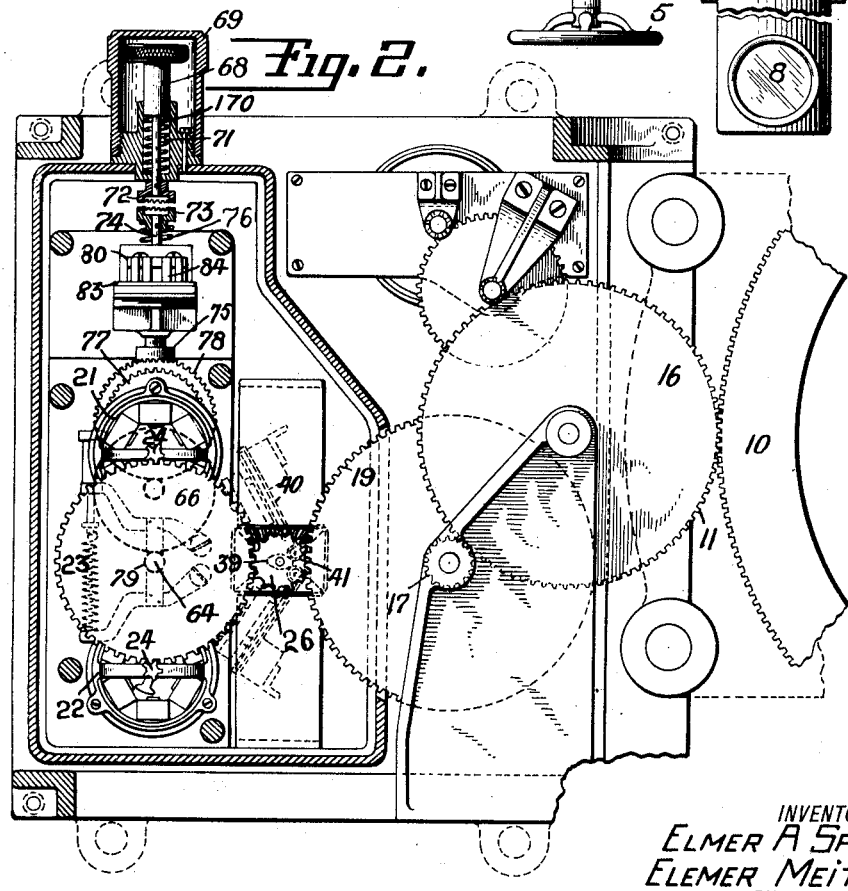
INVENTOR
ELMER A SPERRY AND
ELEMER MEITNER
BY
Herbert H. Thompson
his ATTORNEY Feb. 12, 1924.
E. A. SPERRY ET AL
1,483,489
SIGNALING SYSTEM FOR WARSHIPS
Filed May 20, 1918    6 Sheets-Sheet 2
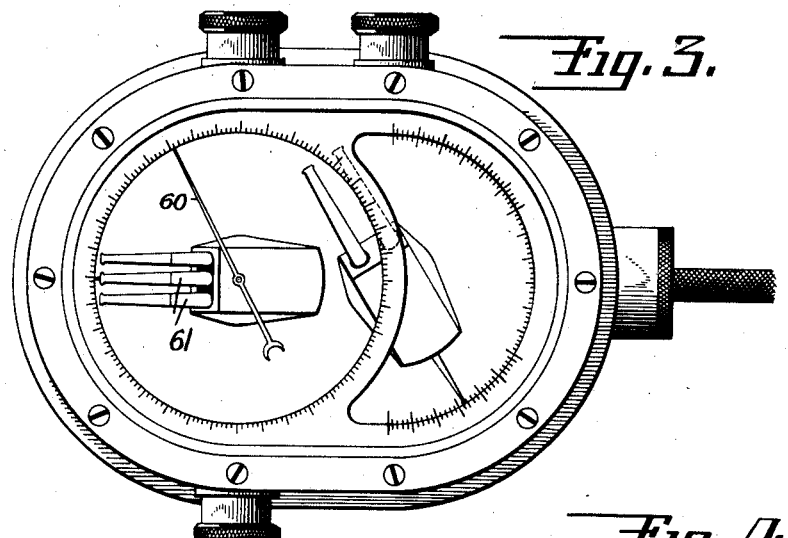
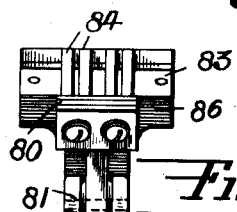
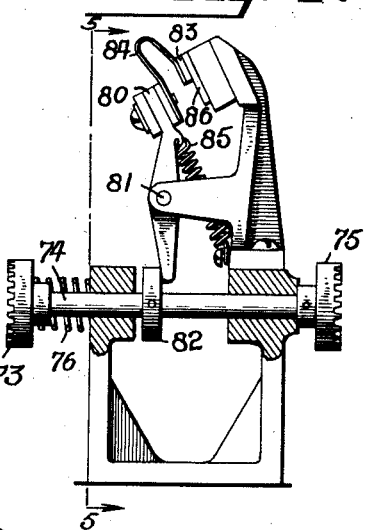
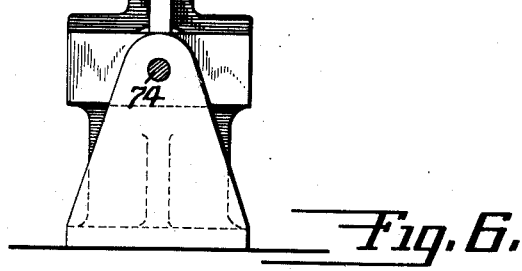
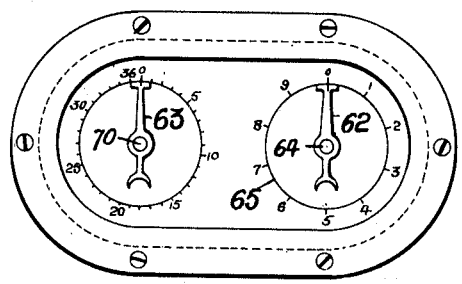
INVENTOR
ELMER A SPERRY AND
ELEMER MEITNER
BY
Herbert H. Thompson
his ATTORNEY

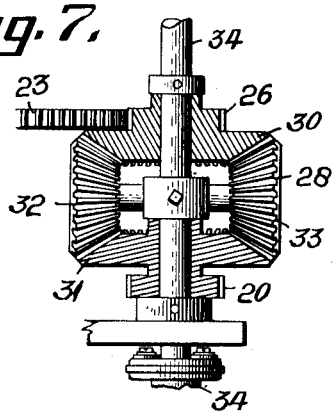
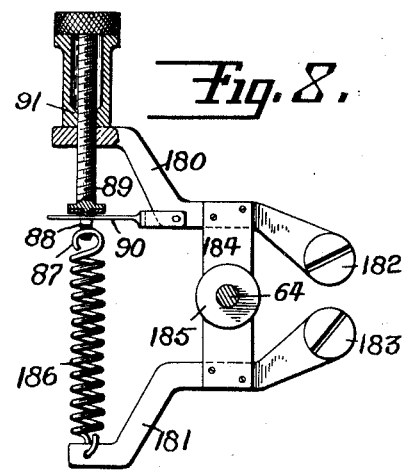
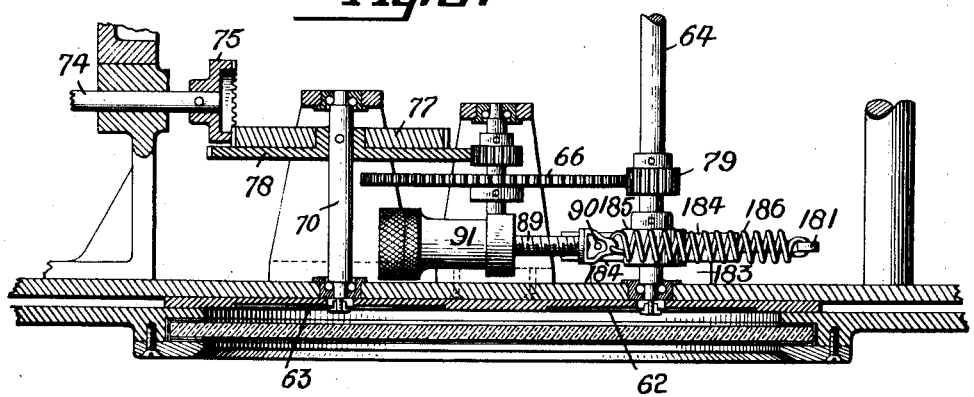
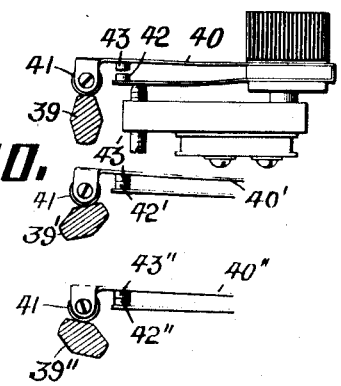

Feb. 12, 1924.
E. A. SPERRY ET AL
1,483,489
SIGNALING SYSTEM FOR WARSHIPS
Filed May 20, 1918     6 Sheets-Sheet 4
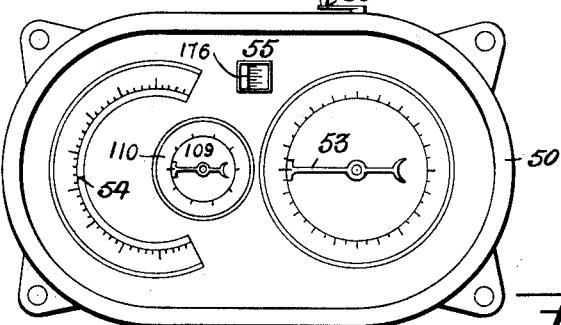
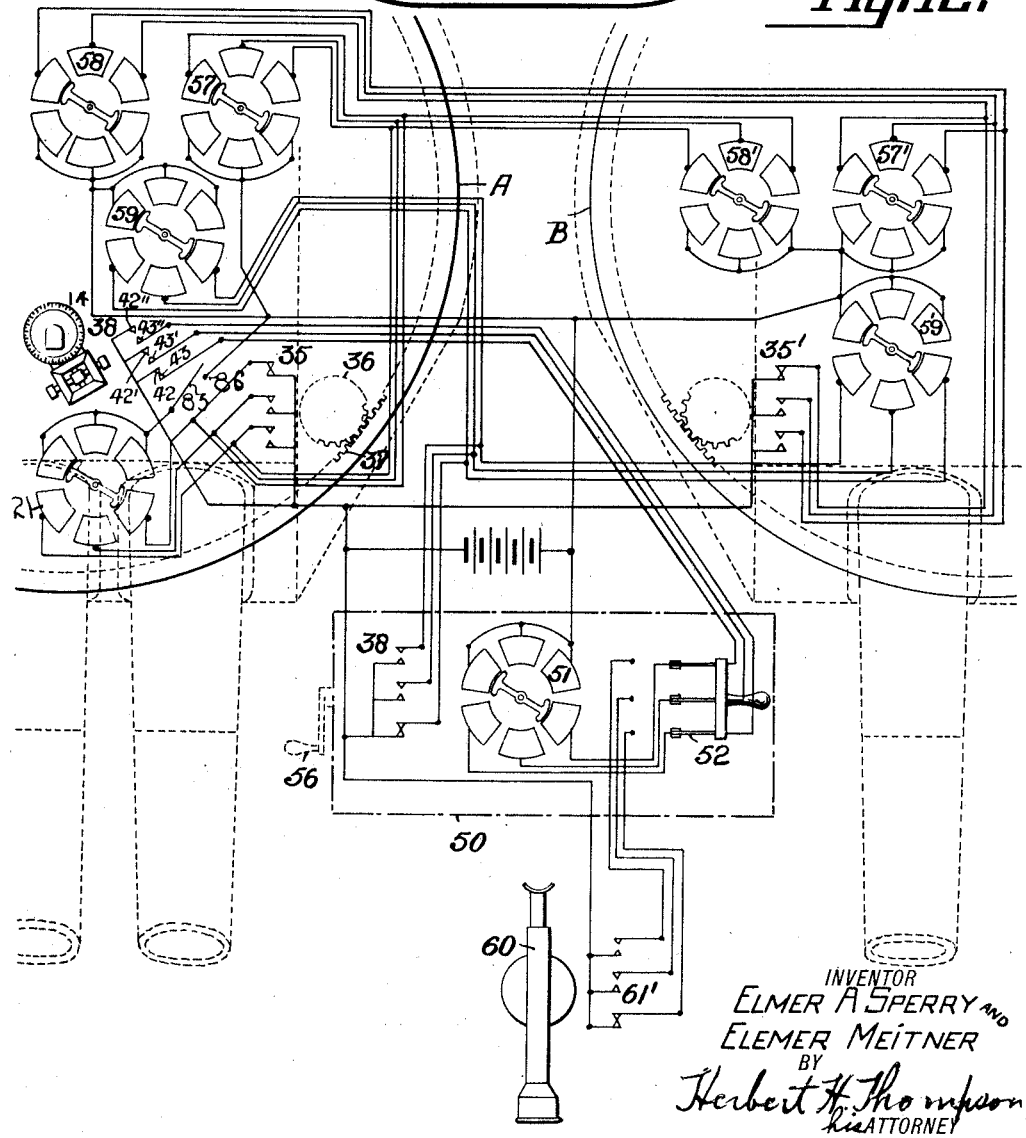
INVENTOR
ELMER A SPERRY AND
ELEMER MEITNER
BY
Herbert H. Thompson
HIS ATTORNEY Feb. 12, 1924. 1,483,489
E. A. SPERRY ET AL
SIGNALING SYSTEM FOR WARSHIPS
Filed May 20, 1918 6 Sheets-Sheet 5
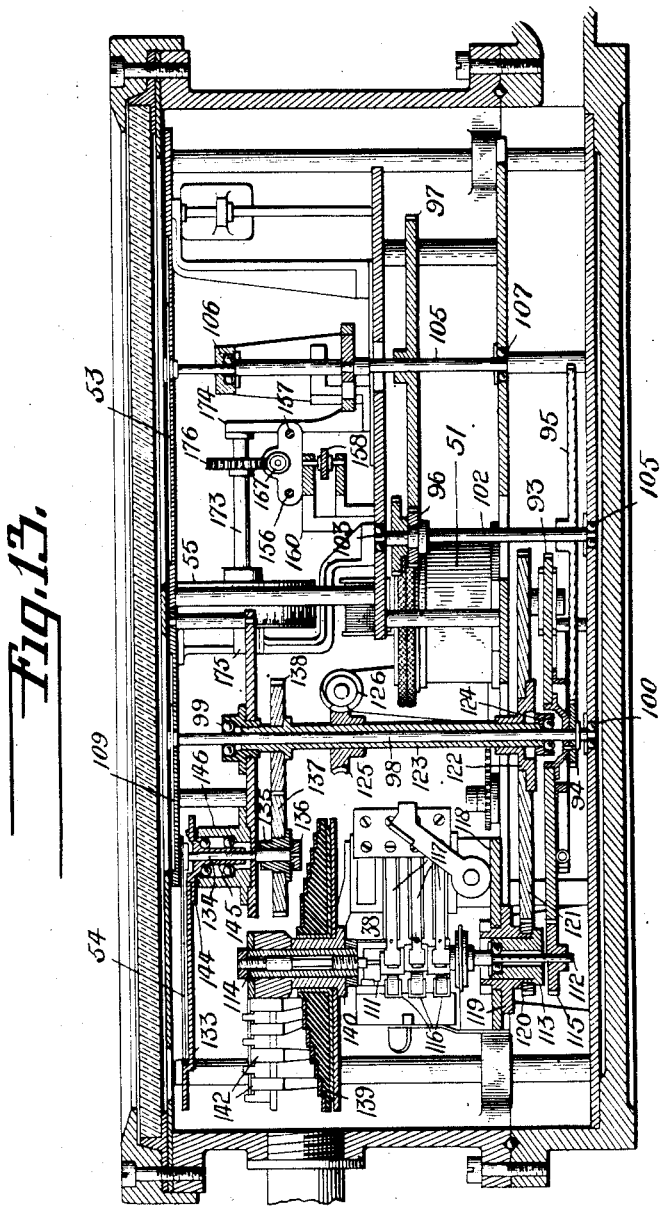
INVENTOR
ELMER A. SPERRY &
BY ELMER MEITNER
Herbert H. Thompson
THEIR ATTORNEY Feb. 12, 1924.
E. A. SPERRY ET AL
SIGNALING SYSTEM FOR WARSHIPS
Filed May 20, 1918      6 Sheets-Sheet 6
1,483,489
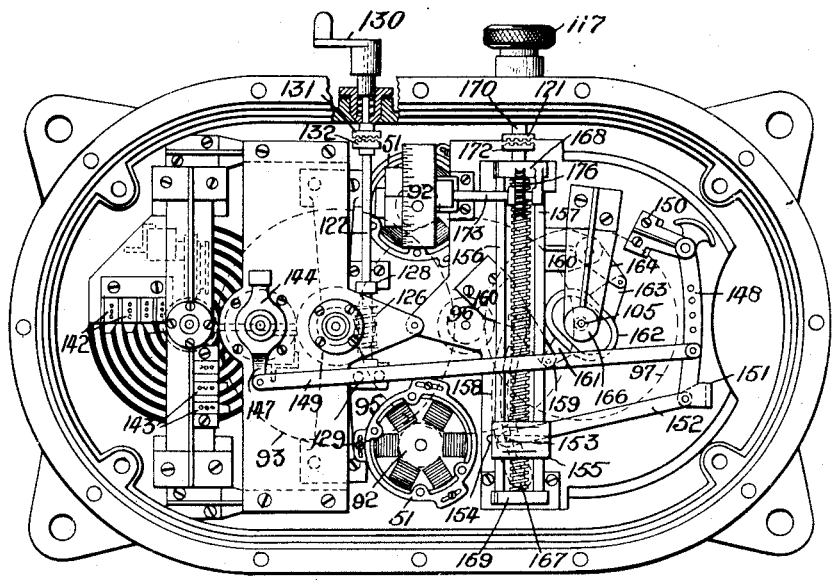
INVENTOR
ELMER A. SPERRY. &
BY ELMER MEITNER
Herbert H. Thompson
THEIR ATTORNEY Patented Feb. 12, 1924.

1,483,489

UNITED STATES PATENT OFFICE.

ELMER A. SPERRY AND ELEMER MEITNER, OF BROOKLYN, NEW YORK, ASSIGNORS TO THE SPERRY GYROSCOPE COMPANY, OF BROOKLYN, NEW YORK, A CORPORATION OF NEW YORK.

SIGNALING SYSTEM FOR WARSHIPS.

Application filed May 20, 1918. Serial No. 235,449.

*To all whom it may concern:*

Be it known that we, ELMER A. SPERRY and ELEMER MEITNER, a citizen of the United States and a subject of the King of Hungary, respectively, residing at 1505 Albemarle Road and 87 Columbia Heights, Brooklyn, respectively, in the county of Kings and State of New York, have invented certain new and useful Improvements in Signaling Systems for Warships, of which the following is a specification.

This invention relates to telemetric device for ordnance control. More particularly, the invention relates to certain improvements in the type of gunfire control system disclosed in the copending application for multiple turret target indicators, filed August 31, 1914, No. 859,329, by Elmer A. Sperry, now Patent No. 1,296,439.

With the increase in the size of ships and the number of turrets and guns mounted thereon, it has been found desirable not only to employ one or more target bearing telescopes or other sighting instruments in the fighting tops but also to employ disappearing sighting instruments on certain or all of the guns or turrets themselves, such as instruments in the form of periscopes.

One of the objects of the invention is to provide a transmitting mechanism for transmitting the position of the periscope with reference to the ship to a central point. Another object of the invention is to effect certain improvements in transmitting and receiving instruments of this character whereby the accuracy of operation is increased.

Referring to the drawings in which, what is now considered the preferred form of the invention, is illustrated:

Fig. 1 is a vertical section through a portion of the turret containing the periscope or sighting device, a section being taken also through the transmitting mechanism connected therewith.

Fig. 2 is a horizontal section taken approximately on line 2—2 of Fig. 1.

Fig. 3 is a plan view of a receiving instrument for use within the turret.

Fig. 4 is a side elevation of a detached portion of the sending instrument showing a novel attachment for the hand setting means.

Fig. 5 is an end view partly in section of Fig. 4, the view being taken substantially on line 5—5 of Fig. 4.

Fig. 6 is a bottom plan view of the indicating portion of the transmitting means.

Fig. 7 is an enlarged sectional detail of the differential gear train shown in Fig. 1.

Fig. 8 is an enlarged detail partly in section of a brake used in connection with said apparatus.

Fig. 9 is an enlarged sectional end elevation of the gearing located between shafts 64 and 74 at the bottom of the instrument shown in Fig. 1.

Fig. 10 is a diagrammatic development of the transmitter showing the three fingers thereof positioned one below the other instead of behind one another, in order to illustrate the different angular positions of the cams.

Fig. 11 is a plan view of the central station receiving instrument.

Fig. 12 is a diagrammatic view showing the wiring of the various instruments, and illustrating a portion of the complete system of gunfire control.

Fig. 13 is a longitudinal sectional elevation of a central station receiving instrument. Fig. 14 is a plan view of the instrument illustrated in Fig. 13 with the dial and certain other parts removed.

As before stated it has been found desirable to employ on one or more of the turrets or other gun platforms of the ship a disappearing sighting device such as a periscope 1 shown as supported in frame 2 journaled in a bracket 3 on the turret A (Fig. 12), the bearing being shown at 4. The periscope may be rotated by means of a hand wheel 5 which has secured thereto a pinion 6 meshing with a large fixed internal gear 7. As the hand wheel is rotated, the hand wheel, together with the bracket and periscope will be revolved about the axis of the latter. The eye-piece of the periscope is represented at 8, while the object glass is shown at 9.

Secured to the periscope so as to rotate therewith is a large gear 10 which serves to rotate smaller double gear 11 upon a shaft 12 journaled in a frame 13 secured within the turret. From the said gears 11, the transmitter 14 is actuated for transmitting to a distance the bearings of the periscope. Preferably a speed limiting device, shown as enclosed within a box 15 is interposed between the gear 11 and the transmitter but since said speed limiting device forms no part of this invention it need not be described in detail. Suffice it to say, that the shaft 12 is driven from said periscope and serves to rotate the gear 16 which meshes with the pinion 17 on shaft 18. A larger gear 19 also on shaft 18 meshes with a pinion 20. If transmitter 14 were driven directly by the periscope as by means of the pinion 20, it will be readily seen that the true bearings on the turret would not be transmitted to an instrument outside of the turret since when the turret is rotated the periscope would be carried around with it without affecting the transmitter.

In order that the true bearings may be transmitted we employ means driven by the movement of the turret which compensates for said movement. Such means is shown as one or more repeater motors 21 and 22. Said motors may be of the type disclosed in the aforesaid application, and are each connected to the large gear 23 by pinions 24 mounted on the motor shafts. Said gear meshes with a pinion 26 which is connected to one arm of a differential or epicyclic gear train 28; the pinion 20 aforesaid being connected to the opposite arm of said gear train. For convenience in illustrating, a conventional bevel gear train is shown (see Fig. 7). It is composed of a bevel gear 30 secured to rotate with pinion 26 and the bevel gear 31 secured to rotate with pinion 20. The middle arm of said train which comprises gears 32 and 33 is fixed to the cam shaft 34 of the transmitter 14.

Repeater motors 21 and 22 are driven from one or more transmitters 35 connected so as to be actuated by the rotation of the turret. The transmitter 35 is shown diagrammatically in Fig. 12 and is rotated by means of a gear 36 meshing with a large rack 37 on the turret. In Fig. 12 in order to simplify the showing, only one repeater motor 21 and only one transmitter 35 are shown. It will be readily seen that the cam shaft 34 of the transmitter 14 will be driven at the average speed of the turret and periscope. In other words, the true motion of the periscope with respect to the ship will be transmitted since the movements of the turret are compensated for. For example, if the periscope has been sighted on a target and the turret is moved in one direction through a given angle, the periscope to be maintained on the target must be moved through an equal angle in the opposite direction, but since said turret and periscope are connected with the transmitter through the differential mechanism aforesaid the correct transmitted bearing of the periscope with respect to the ship remains unchanged. The transmitter 14 is shown as comprising cam shaft 34 aforesaid, on which is mounted a plurality of cams 39, 39' and 39'' (Fig. 10) positioned at an angle to on another. Spring blades 40, 40' and 40'' carrying rollers 41 at the ends rest upon said cams and are raised thereby as the higher portion of the cam comes under the roller. By this means the pairs of contacts 42 and 43, 42' and 43' and 42'' and 43'' on the spring base and on the spring arm are opened and closed as the cam shaft rotates. If desired, one of repeater motors 21, 22 may be energized in between the steps of the other, as disclosed in the copending application of E. Meitner, Serial No. 61,480, for range indicator, filed November 15, 1915. In this arrangement said motors may be said to be out of phase with each other since while one motor is stationary the other is receiving a new impulse. With this arrangement it will also be seen that double the number of steps obtainable by one motor alone may be secured.

The said transmitter 14 is preferably connected to a central station receiving instrument, so that the officer at the central station of the ship may be informed of the bearings of the target. In the diagram this instrument is represented at 50; a repeater motor 51 (Fig. 12) being shown therein which is connected through switch 52, to said transmitter 14. The face view of said instrument is shown in Fig. 11 and the instrument is shown in detail in Figs. 13 and 14. Such an instrument is made use of also as a sending instrument, to send out to the various turrets the target bearings corrected for side drift, range, etc. In Figs. 13 and 14 we have shown one form of such instrument, substantially as disclosed in our copending application entitled "Improvements in director firing systems," Serial No. 160,877, filed April 9, 1917. In this instrument we have shown two repeater motors 51, 51 driving transmitter 38, though it is evident that only one such motor might be used. In Fig. 12 only one of motors 51 has been shown for the sake of clearness. Pointer 53 is connected by suitable gearing with repeater motors 51, 51 to be driven by the latter. Such gearing may take the form of the train of gears shown as 92, 92, 93, 94, 95, 96, and 97. Spur gears 92, 92 are mounted on the armature shafts of the repeater motors 51, 51, and mesh with a gear 93 fixed on a shaft 98, rotatably mounted in the frame of the instrument by suitable bearings, such as ball bearings 99, 100 and said gear 93 has fixedly secured thereto a gear 94. The last mentioned gear meshes with spur gear 95 fixed on a shaft 102, rotatably mounted in bearings 103, 104 in the motor frame which shaft also has fixed thereon a gear 96. The shaft 105 which carries the pointer 53 is rotatably mounted in the frame by means of bearings 106 and 107 and carries a gear 97 adapted to mesh with the gear 96. The shaft 98 may be provided at its upper end with a pointer 109 cooperating with a scale 110. Pointer 53 may indicate degrees and pointer 109 fractions of a degree.

Transmitter 38 is shown as comprising a drum 111 mounted on a shaft 112 suitably journaled in fixed sleeves 113 and 114, which shaft has fixed thereto a gear 115 which meshes with the gear 93.

The means for applying a correction to the transmitted bearing may take the form illustrated in Figs. 13 and 14, wherein the contacts controlled by the drum 111 are shiftable by suitable means and means provided for indicating the amount of displacement. The contacts 116 and 117 are shown as mounted on a bracket 118 and as being fixed at an angle of 90° with each other, though this angle may have other values. The bracket 118 is rotatably mounted with respect to the drum 111 and the instrument frame by being secured to a sleeve 119 surrounding and rotatable with respect to fixed sleeve 113. Secured to and rotatable with sleeve 119 is a pinion 120 meshing with a gear 121 fixed to sleeve 122, which is fixed in turn to a sleeve 123 rotatably mounted in fixed bearings 99 and 124. The sleeve 123 has also fixed thereon a worm wheel 125 meshing with a worm 126 on a shaft 127 which is suitably journalled in stationary brackets 128 and 129. The shaft 127 may be rotated by a crank 130 adapted to be connected to said shaft by a clutch 131, 132. Thus it is obvious that by turning the crank 130, the contacts 116 and 117 will be angularly shifted.

For indicating the amount of displacement of contacts 116, 117 we have shown a pointer 54, which cooperates with a scale 133 and is mounted on a shaft 134 suitably journalled at 135 and 136 and carrying a gear 137 meshing with a gear 138 secured to the sleeve 123.

As has been previously mentioned, the contacts 116 and 117 are rotatable with respect to the frame of the instrument so that some means is necessary to conduct current to and from these contacts. Such means may take the form of slip rings and brushes as illustrated in Figs. 13 and 14, in which the disc 139 of insulating material is secured to a sleeve 140 which forms an extension of the bracket 118. The disc 139 carries slip fingers 141 to which contacts 116 and 117 are adapted to be connected and with which the stationary brushes 142 and 143 engage.

For applying the correction due to the distance of the turrets from the central receiving station, scale 133 is shifted an amount dependent on the bearing and the range. For this purpose scale 133 is shown as secured to the flange 144 of sleeve 145 suitably journaled in cup-shaped bearing 146. Flange 144 is provided with an extension 147 which is connected to a lever 148 by means of a link 149. Lever 148 is pivotally connected at one end to a stationary bracket 150 and is provided at its other end with a downwardly extending U-shaped portion 151 which is pivotally connected to one end of a link 152. The latter is provided at its other end with a pin 153 slidable in a slot 154 provided in the lower face of a nut 155 mounted for sliding movement on guide rods 156 and 157. The pin 153 extends also through the slot of a slotted arcuate arm 158 of a bell crank lever of which the other arm is designated 159. This bell crank lever 158 is pivoted on a stationary bracket 160 and its short arm 159 is pivotally connected to the arm 161 of a yoke 162 of which the other arm 163 is connected to one end of a link 164 pivoted at its other end on a stationary bracket 165. Fixedly mounted on the shaft 105 is a cam 166 which engages the interior of the yoke 162. By virtue of the connections just described it is clear that the position of scale 133 is controlled by the position of the shaft 105 and the extent of movement of the scale 133 for any given movement of the cam 166 depends on the position of the pin 153 in the slot of the arm 158, which position may be controlled by sliding the nut 155 along guides 156, 157. One form of means for sliding the nut 155 is shown in Figs. 13 and 14 and comprises a screw threaded shaft 167 rotatably mounted on brackets 168 and 169 and engaging the nut 155 at its screw threaded portion. The shaft 167 may be rotated in any suitable manner, as handle 56 connected to crank shaft 170 and clutch 171, 172. The nut 155 may be set at different positions along the rods 156, 157 for different ranges by the mechanism above described, so that the position of the scale 133 is dependent on the range. In Fig. 14, 177 designates a suitable housing which may be provided for crank handle 56.

Suitable means may be provided for indicating the setting of the nut 155 by the shaft 161. Such means may take the form illustrated in Figs. 13 and 14 and constructed as follows: The shaft 173 is rotatably mounted in brackets 174 and 175 and fixedly carries a worm wheel 176 which meshes with the threaded portion of shaft 167. The shaft 173 carries also a calibrated drum 55 adapted to cooperate with a fixed reference line 176. The corrected readings are thus sent out by transmitter 38 in circuit with the target bearing indicators on the various turrets. One of such indicators is represented in Fig. 3 as adapted for indicating not only the target bearings for that turret, but also the position of the containing turret and the position of the adjoining interfering turret, and is of the type shown in the Patent No. 1,296,439, above referred to. Such indicators are operated by a plurality of repeater motors 57, 58 and 59. The last named motor is connected to the transmitter 38 and hence employed to rotate the target bearing indicating pointer 60, while the motor 57 is connected to the transmitter 35 on the containing turret and hence is employed to rotate the position indicating dial 61 for the containing turret. The motor 58 on the other hand is actuated from a similar transmitter 35' in the interfering turret B. Said turret B is also shown as provided with a target bearing indicator having motor 59' actuated from transmitter 38, motor 57' actuated from the transmitter 35' of the containing turret and repeater-motor 58' in circuit with the same transmitter 35 of the first mentioned turret A. The usual target bearing telescope 60 may also be employed. The telescope as shown is provided with a transmitter 61' which is connected to the repeater motor 51 within the central station receiver through the aforesaid double-throw switch 52. Said switch is made use of to connect either the target bearing telescope or the periscope to the turret through the central station receiver so that if one slighting instrument is destroyed in a battle, another may be immediately put into service.

That portion of the transmitting mechanism connected to the periscope which is actuated by the repeater motors 21 and 22 is of course in effect a receiving instrument and may be provided with one or more indicating pointers 62, 63. The pointer 62 is shown as mounted on the shaft 64 of large gear 23 so that it indicates the position of the turret on the graduated dial 65. The pointer 63 which is mounted on shaft 70 (Fig. 9) may be connected through step-up gearing 66 to the said shaft 64 so that it is rotated at several times the speed of the pointer 62 thereby indicating the position of the turret more accurately.

In repeater systems of this character it frequently happens that the receiving instrument falls out of step with the sending instrument, so that the indications thereof are inaccurate. When repeater motors of this character are employed in which a great many revolutions of the motor to take place to one revolution of the indicator the receiving instrument will not automatically fall back into step if the repeater motor is out of step more than one-half a revolution. We find it desirable therefore to provide a setting device by means of which the receiver may be synchronized with the sending instrument. A simple form of setting means comprises a finger piece 68 (Fig. 2) shown as covered by a removable cap 69 and mounted upon shaft 170. Normally the finger piece is pressed outwardly by spring 71 but by pushing inwardly thereon crown gear teeth 72 on said shaft are brought into engagement with similar teeth 73 on a shaft 74. Said shaft 74 is also provided with a second crown gear 75 which when the shaft is moved longitudinally against the action of spring 76 is brought into engagement with the spur gear 77 pinned to shaft 70 (Figs. 2 and 9). It will be readily apparent therefore that as the finger piece is pushed in and rotated the gear 77 will be rotated also. Said gear may be secured to shaft 70 and large gear 78 which in turn drives pinion 79 on shaft 64 through said reduction gear 66 so that repeater motors and also the indicating pointers 62, 63 are readily brought into the correct position. The indications of pointers 62, 63 may be compared from time to time with the position of the turret as indicated by any other suitable means. The pointers may then be moved into the correct position, that is into the position at which they indicate the position of the turret correctly.

We also prefer to provide means for de-energizing the repeater motors when it is desired to set the instruments by hand since repeater motors of this character tend to remain in whatever position their field poles have been when energized and it requires considerable force, especially where the motors are geared up with respect to the indicator, to rotate the indicator against the action of the motors. For such purpose we have shown a switch member 80 pivoted at 81 and bearing at one end against a collar 82 on shaft 74. Said member is provided adjacent the other end with a contact piece 83 on a spring 84. Said contact is normally held into engagement with the fixed contact 86 by a spring 85 but when the shaft 74 is moved longitudinally by the pressing in of the finger piece as described it will be readily apparent that the contacts are opened thereby breaking the common circuit leading to the repeater motor as indicated in Fig. 12. By this means a simple, but effective means is provided for avoiding the necessity of turning the repeater motors when energized. Also associated with said instrument is a damping or braking means which is designed to prevent overthrow of the repeater motors and also to prevent excessive oscillations being transmitted to the receiving instrument.

In all repeater systems of this character in which repeater motors are used to mechanically actuate either directly or indirectly transmitters, which in turn are used to actuate electrically other repeater motors, the natural vibratory movements of the first mentioned repeater motors are transmitted through said transmitters to the repeater motors in the receiving instrument. The last named repeater motors also have a tendency to vibrate, which vibration is greatly aggravated by the vibratory impulses sent out from the transmitters so that the vibration of the indicating pointers of the receiver becomes excessive and very troublesome unless an effective means is adopted to damp out such oscillations. For this purpose we have shown a braking device consisting of a pair of arms 180 and 181 pivoted at 182 and 183 adjacent the shaft 64. on each arm is a brake shoe 184 which bears upon a collar 185 on said shaft. The two brake shoes are resiliently pressed against the collar by means of a spring 186. Said spring is preferably adjustable so that the tension may be regulated to the proper value. To this end the spring is secured at one end 87 to eye 88 which is swiveled on the lower end of screw 89 and is prevented from rotating therewith by pin 90. Said screw is threaded in the arm 180 and also has mounted thereon a nut 91 by means of which the screw may be locked in any desired position as will be readily apparent. When properly adjusted such a brake will greatly reduce the vibrations transmitted to the receiving instrument and at the same time prevent to a great extent falling out of step. The brake also has a special value when more than one repeater motor is employed to actuate a single device in preventing one motor from throwing the other out of step.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. The combination with a rotatable gun platform, of a sighting instrument mounted therein, a transmitter for sending to a distance the bearing of said instrument, and means actuated by the rotation of the platform, said transmitter being differentially connected to said instrument and said means.

2. In a receiving instrument, the combination with a movable indicator, of a repeater motor for the same and adapted to be placed in circuit with a distant transmitter, a local hand setting means for said indicator, a switch for deenergizing said motor, and a connection between said switch and setting means for opening the switch by the operation of said setting means.

3. In a repeating system, the combination with a step-by-step repeater motor, of a step-by-step transmitter connected thereto to control a second repeater motor, and a damping means for said first motor and its connected transmitter.

4. In a repeating system, the combination with a step-by-step repeater motor, of a transmitter requiring a variable torque to rotate the same connected thereto to control a second repeater motor, and a continuously acting brake for suppressing oscillations of said first motor and said transmitter.

5. In a repeating system, the combination with a plurality of repeater motors, of a step-by-step transmitter driven therefrom adapted to control another repeater motor, and damping means for said first mentioned motors and the connected transmitter.

6. The combination with a rotatable support adapted to be mounted on a ship, of a sighting instrument carried thereby and movable with respect thereto, a remotely located indicator, and means controlled by movements of said support and by movements of said sighting instrument with respect to said support for actuating said indicator.

7. The combination with a rotatable gun platform, of a sighting instrument mounted thereon, a transmitter for sending to a distance the bearing of said instrument, a repeater motor actuated by rotation of said gun platform, and differential means connecting said transmitter with said repeater motor and said sighting instrument.

8. The combination with a rotatable gun platform, of a sighting instrument mounted thereon for movement with respect thereto, a transmitter connected with said instrument for sending to a distance the bearing of said instrument, and means for preventing rotation of said gun platform from affecting the bearings transmitted.

In testimony whereof we have affixed our signatures.

ELMER A. SPERRY.
ELEMER MEITNER.